United States Patent
Salenbien

(10) Patent No.: US 11,473,446 B1
(45) Date of Patent: Oct. 18, 2022

(54) BEARING CARTRIDGE ASSEMBLY FOR A TURBOCHARGER

(71) Applicant: Ryan Harold Salenbien, Maybee, MI (US)

(72) Inventor: Ryan Harold Salenbien, Maybee, MI (US)

(73) Assignee: ApexTurbo LLC, Dundee, MI (US)

(*) Notice: Subject to any disclaimer, the term of this patent is extended or adjusted under 35 U.S.C. 154(b) by 0 days.

(21) Appl. No.: 17/479,735

(22) Filed: Sep. 20, 2021

(51) Int. Cl.
F01D 25/16 (2006.01)
F16C 35/077 (2006.01)
F16C 33/58 (2006.01)

(52) U.S. Cl.
CPC .............. *F01D 25/16* (2013.01); *F16C 33/58* (2013.01); *F16C 35/077* (2013.01); *F05D 2220/40* (2013.01); *F05D 2240/50* (2013.01); *F16C 2360/24* (2013.01)

(58) Field of Classification Search
CPC ........ F01D 25/16; F16C 33/58; F16C 35/077; F16C 2360/24; F16C 19/38; F16C 19/28; F16C 13/006; F16C 19/54; F16C 19/541; F16C 19/542; F05D 2220/40; F05D 2240/50
See application file for complete search history.

(56) References Cited

U.S. PATENT DOCUMENTS

| 5,803,612 | A | * | 9/1998 | Battig | .................. | F16C 19/542 |
| | | | | | | 384/99 |
| 7,371,011 | B2 | | 5/2008 | McKeirnan, Jr. | | |
| 7,832,938 | B2 | | 11/2010 | McKeirnan, Jr. | | |
| 8,740,465 | B2 | | 6/2014 | McKeirnan, Jr. | | |
| 8,845,271 | B2 | | 9/2014 | Delgado | | |
| 9,004,774 | B1 | | 4/2015 | Delgado | | |
| 9,816,551 | B2 | | 11/2017 | Regnier et al. | | |
| 10,184,515 | B2 | * | 1/2019 | Matsunaga | ........... | F16C 33/583 |
| 2003/0072509 | A1 | * | 4/2003 | Woollenweber | ........ | F16C 27/04 |
| | | | | | | 384/490 |
| 2007/0036477 | A1 | * | 2/2007 | McKeirnan, Jr. | ..... | F16C 19/548 |
| | | | | | | 384/517 |

(Continued)

FOREIGN PATENT DOCUMENTS

| CN | 102128063 A | 7/2011 |
| JP | 20160061218 A | 4/2016 |

*Primary Examiner* — Jesse S Bogue
(74) *Attorney, Agent, or Firm* — Harness, Dickey & Pierce, P.L.C.

(57) ABSTRACT

A turbocharger assembly including a housing, a shaft, and turbine and compressor wheels mounted on opposite ends of the shaft. The shaft is rotatably supported within the housing by a bearing cartridge that includes turbine-side and compressor side ball-bearing assemblies that are longitudinally spaced by a spacer. There are two times as many rows of ball-bearings included in the turbine-side ball-bearing assembly compared to the compressor-side ball-bearing assembly. The spacer slides over and rotates with the shaft and has at least one flat. An optical sensor extends through the housing and an optical sensor opening in the bearing cartridge to prevent the bearing cartridge from rotating within the housing. The optical sensor detects rotational speed of the spacer by counting the number of times the flat(s) passes by the optical sensor during a pre-determined time interval.

20 Claims, 7 Drawing Sheets

(56) References Cited

U.S. PATENT DOCUMENTS

| | | | |
|---|---|---|---|
| 2008/0019629 A1* | 1/2008 | McKeirnan | F16C 19/548 |
| | | | 384/493 |
| 2008/0087018 A1* | 4/2008 | Woollenweber | F16C 27/066 |
| | | | 60/605.1 |
| 2009/0013687 A1 | 1/2009 | Swenson et al. | |
| 2011/0236193 A1* | 9/2011 | Chriss | F04D 25/04 |
| | | | 415/180 |
| 2013/0149116 A1* | 6/2013 | Hornbach | F01D 17/06 |
| | | | 415/170.1 |
| 2013/0287547 A1* | 10/2013 | Berruet | F16C 33/66 |
| | | | 384/474 |
| 2014/0023496 A1* | 1/2014 | Watanpour | F01D 25/166 |
| | | | 415/229 |
| 2017/0335717 A1* | 11/2017 | Isogai | F16C 19/54 |
| 2018/0340954 A1 | 11/2018 | Ishino | |
| 2020/0063678 A1 | 2/2020 | Asai et al. | |
| 2020/0300260 A1* | 9/2020 | Uneura | F04D 13/12 |
| 2020/0378260 A1* | 12/2020 | Wakashima | G01M 1/16 |

\* cited by examiner

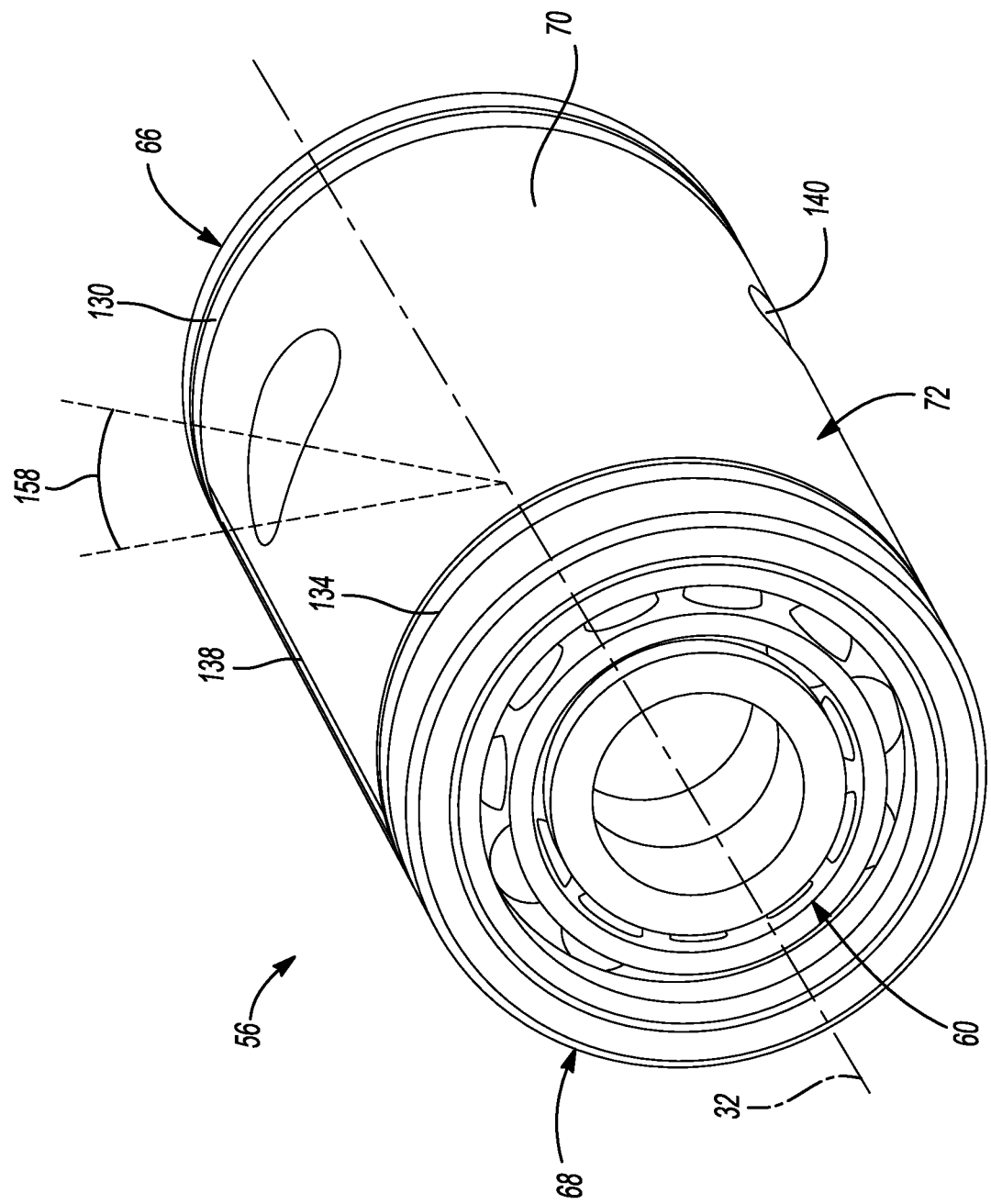

BEARING CARTRIDGE ASSEMBLY FOR A TURBOCHARGER

FIELD

The subject disclosure generally relates to turbochargers for internal combustion engines. More particularly, an improved bearing cartridge assembly for a turbocharger is described herein.

BACKGROUND

The statements in this section merely provide background information related to the present disclosure and may not constitute prior art.

A turbocharger is a turbine-driven forced induction device that increases the efficiency and power output of an internal combustion engine by forcing extra air into the combustion chamber compared to naturally aspirated engines. Turbochargers are used in a wide variety of internal combustion engines, including gas, diesel, alcohol, and methanol fueled engines. Turbochargers are used in engines to increase intake air flow with a resulting horsepower gain/advantage.

Turbochargers typically include a turbine wheel that is arranged in communication with exhaust flow from the internal combustion engine and a compressor wheel that is arranged in communication with intake air flowing into the internal combustion engine. The turbine wheel and compressor wheel are both mounted to a shaft that is rotatably supported within a housing by a bearing assembly. The turbine wheel includes a plurality of turbine blades that are positioned in the exhaust flow such that the turbine wheel is rotatably driven by the exhaust flow as it flows through the plurality of turbine blades. The compressor wheel rotates at the same speed as the turbine wheel such that the compressor blades increase the speed and pressure of the intake air flowing into the internal combustion engine for increased power delivery.

In typical turbochargers, the bearing assembly that supports the shaft in the housing includes one bearing on the turbine-side of the shaft and one additional bearing on the compressor-side of the shaft. Each bearing may include inner and outer races with a plurality of ball bearings positioned radially between the inner and outer races. In some turbochargers, the bearings are lubricated by grease, while in other turbochargers the bearings are lubricated by oil in an "open bath" lubrication arrangement. Despite advances in turbocharger and bearing designs, bearing failure is still a primary failure mode for turbochargers. Thus, the need for more durable turbocharger bearing assemblies with less drag (i.e., less rotating inertia and rotating resistance) remains.

SUMMARY

This section provides background information related to the present disclosure and is not necessarily prior art.

In accordance with one aspect of the subject disclosure, a turbocharger assembly is provided. The turbocharger assembly includes a housing, a shaft, a turbine wheel, and a compressor wheel. The shaft is rotatably supported within the housing by a bearing cartridge. The turbine wheel and the compressor wheel are mounted on opposite ends of the shaft and are disposed within the housing. The turbine wheel and the compressor wheel both have a plurality of blades. The housing includes a cartridge receiving bore that receives the bearing cartridge. The bearing cartridge extends co-axially about and supports the shaft at a location positioned longitudinally between the turbine and compressor wheels. The bearing cartridge has a bearing cartridge wall that is arranged in contact with the cartridge receiving bore and includes a turbine-side ball-bearing assembly and a compressor-side ball-bearing assembly. The compressor-side ball-bearing assembly is disposed adjacent to the compressor wheel and the turbine-side ball-bearing assembly is disposed adjacent to the turbine wheel. In accordance with an aspect of the present disclosure, there are two times as many rows of ball-bearings included in the turbine-side ball-bearing assembly compared to the compressor-side ball-bearing assembly. For example, in accordance with one aspect of the present disclosure, the compressor-side ball-bearing assembly includes a first angular contact ball-bearing, while the turbine-side ball-bearing assembly includes a second angular contact ball-bearing and a third angular contact ball-bearing that are disposed in end-to-end abutting contact with one another.

In accordance with another aspect of the present disclosure, the turbocharger assembly further includes a spacer that is positioned longitudinally between the turbine-side and compressor-side ball-bearing assemblies. The spacer slides over and rotates with the shaft and has an outer spacer surface with at least one flat. An optical sensor opening extends through the bearing cartridge wall and the turbocharger assembly includes an optical sensor that extends through the housing and the optical sensor opening in the bearing cartridge wall to prevent the bearing cartridge from rotating within the housing. The optical sensor is positioned to detect a rotational speed of the spacer by counting the number of times the flat(s) on the spacer passes by the optical sensor during a pre-determined time interval.

The inventor has found that the durability of turbocharger bearing assemblies can be increased and drag (i.e., rotating inertia and rotating resistance) can be decreased when the turbine-side ball-bearing assembly is designed and constructed to provide twice the thrust capacity as the compressor-side ball-bearing assembly. Instead of simply increasing the size of the turbine-side ball-bearing assembly, the inventor has found that providing two times as many rows of ball-bearings (e.g., two angular contact ball-bearings that are disposed in end-to-end abutting contact with one another) in the turbine-side ball-bearing assembly compared to the compressor-side ball-bearing assembly (e.g., one angular contact ball-bearing) in the compressor-side ball-bearing assembly provides better support for the thrust loads on the shaft and optimizes rotational inertia for improved efficiencies (i.e., less rotating inertia and rotating resistance).

BRIEF DESCRIPTION OF THE DRAWINGS

Other advantages of the present invention will be readily appreciated, as the same becomes better understood by reference to the following detailed description when considered in connection with the accompanying drawings wherein:

FIG. 7 is a perspective end view of the exemplary bearing cartridge illustrated in FIG. 3.

DETAILED DESCRIPTION

Figure 1:
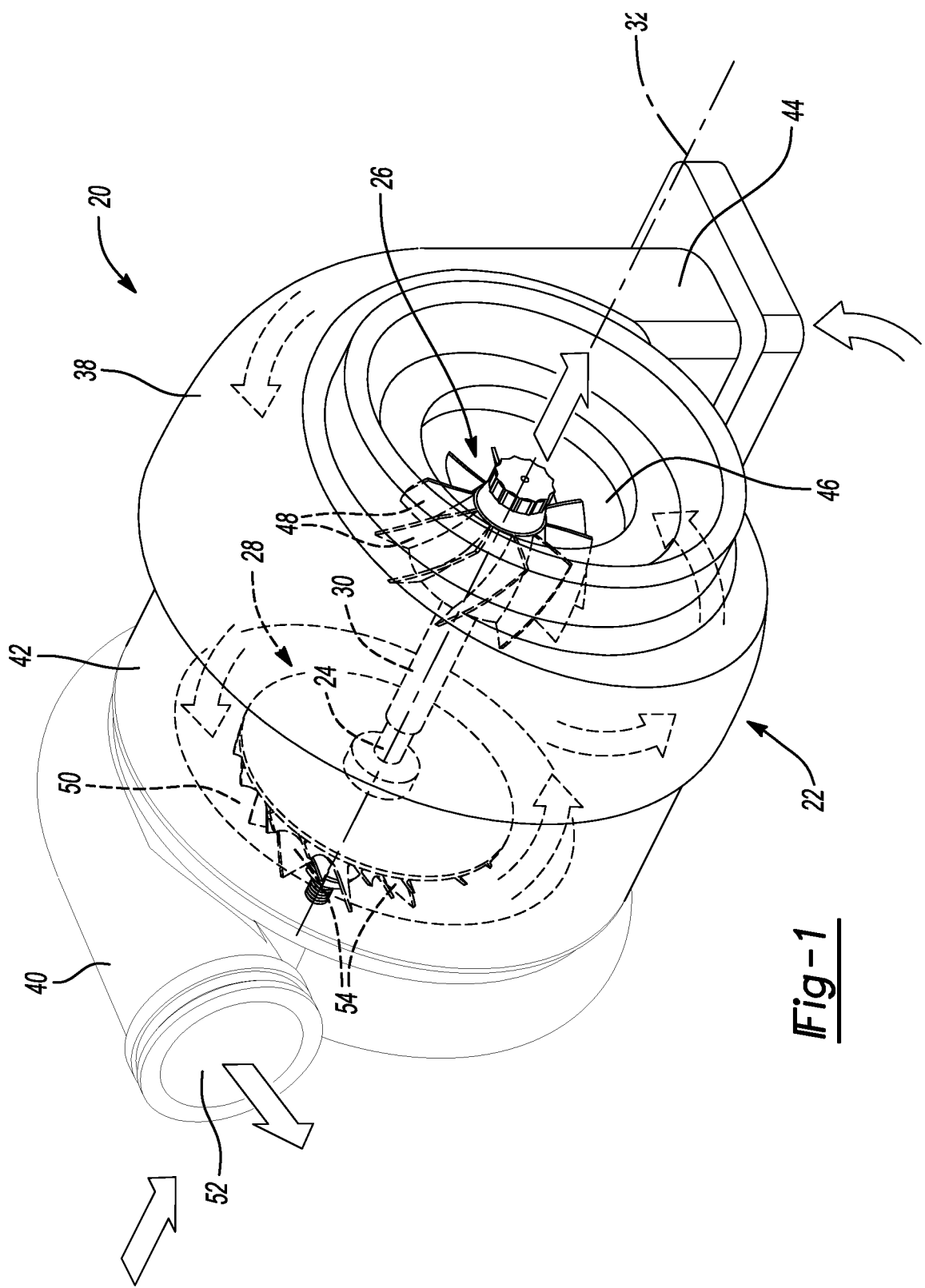
FIG. 1 is a perspective view of an exemplary turbocharger.

Referring to the Figures, wherein like numerals indicate corresponding parts throughout the several views, a turbocharger assembly 20 with a unique bearing arrangement is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "includes," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptors used herein interpreted accordingly.

Figure 2:
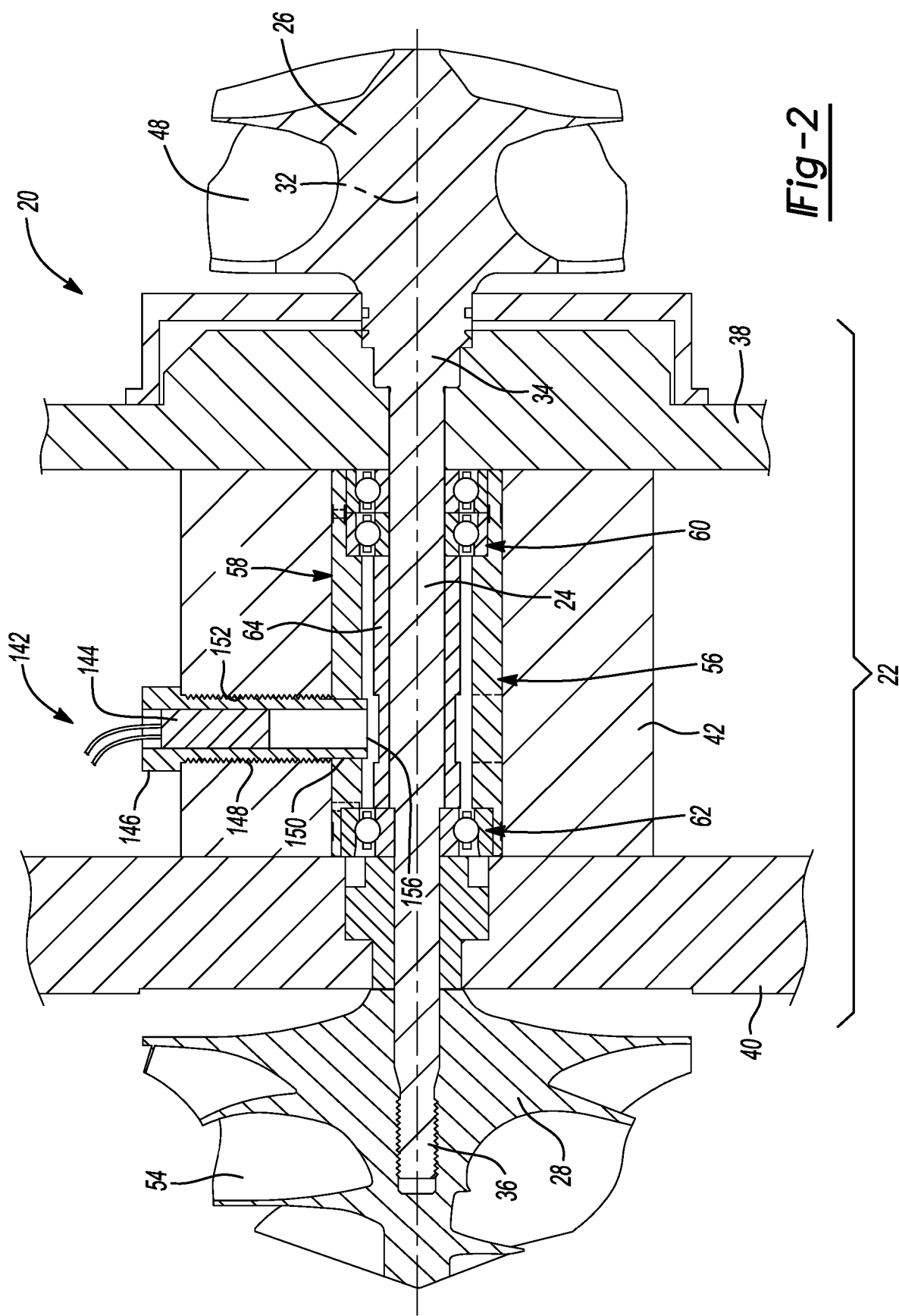
FIG. 2 is a side cross-sectional view of the exemplary turbocharger illustrated in FIG. 1.
Figure 3:
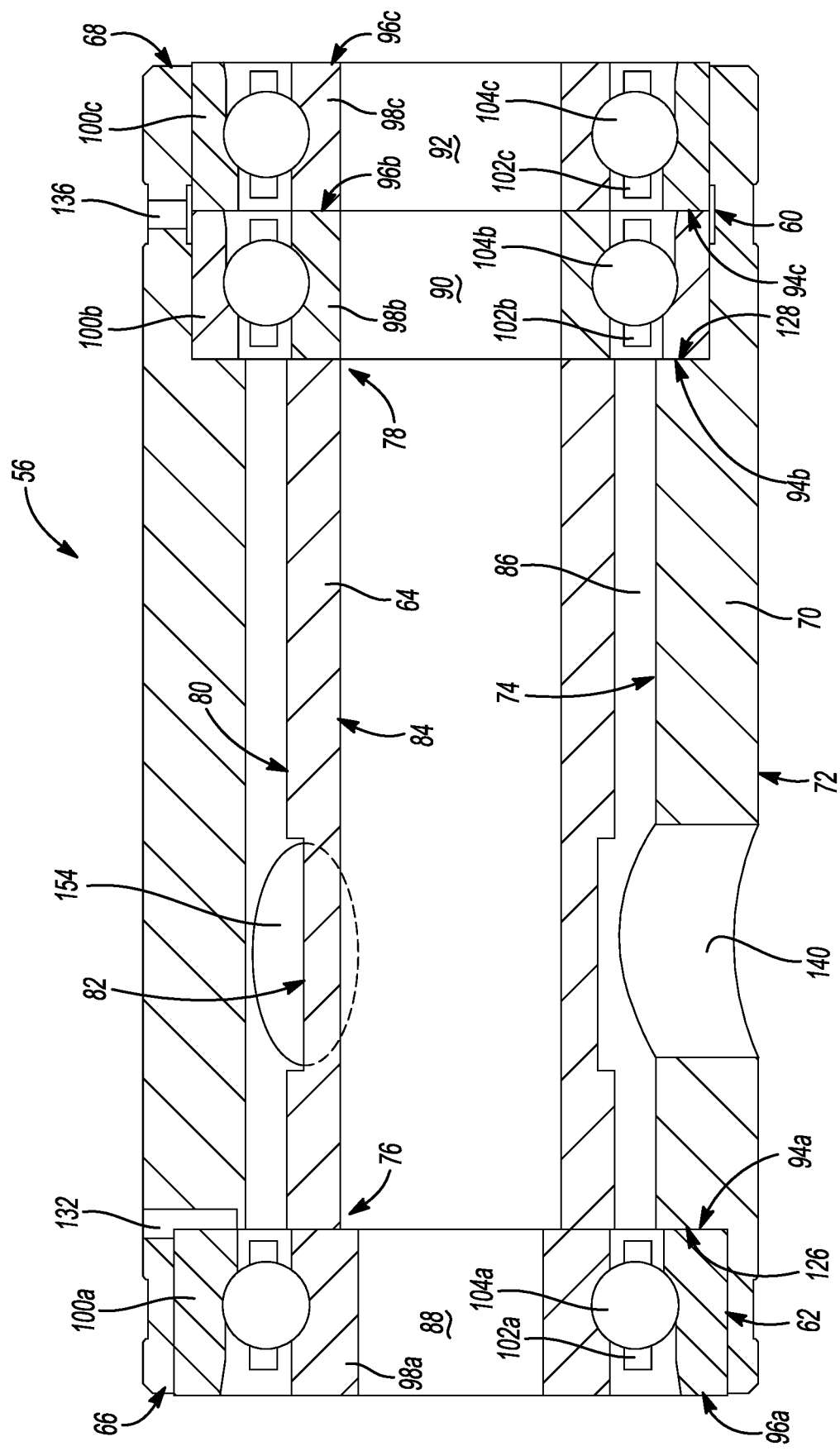
FIG. 3 is a side cross-sectional view of an exemplary bearing cartridge of the turbocharger illustrated in FIG. 1.
Figure 4:
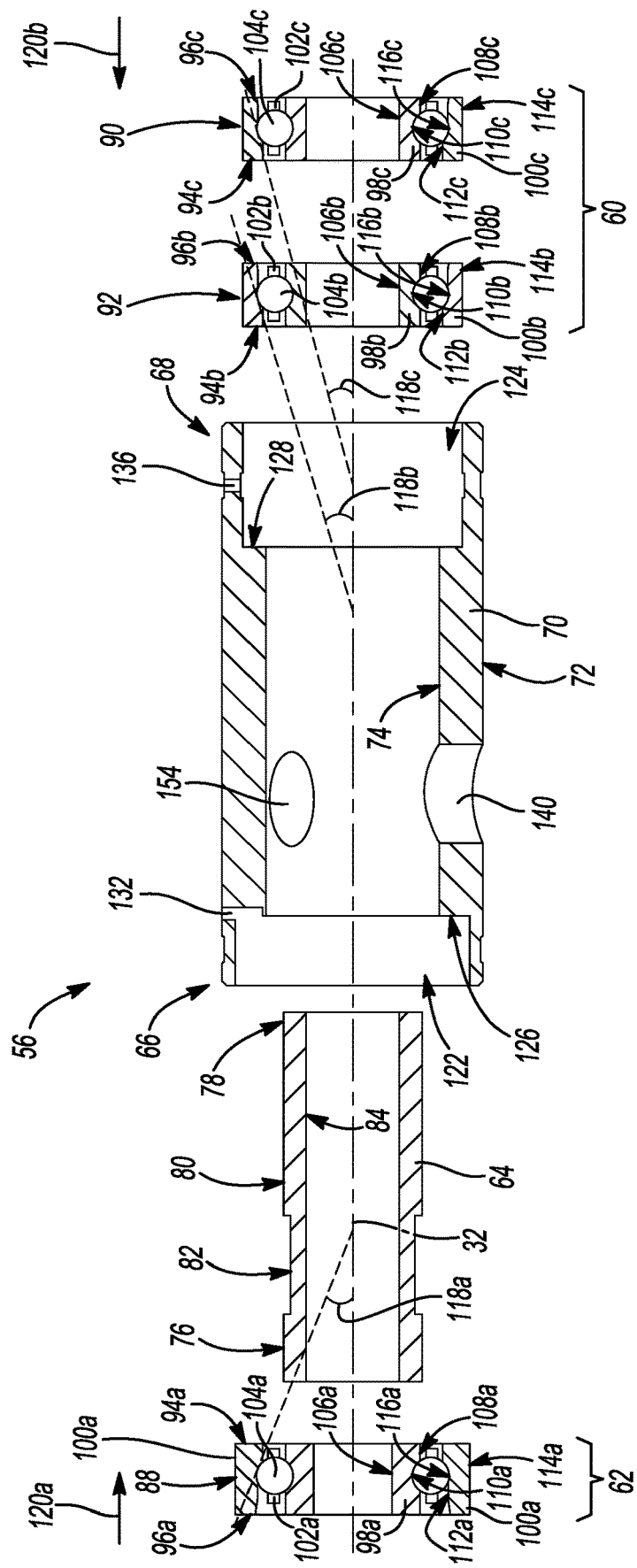
FIG. 4 is an exploded section view of the exemplary bearing cartridge illustrated in FIG. 3.
Figure 5:
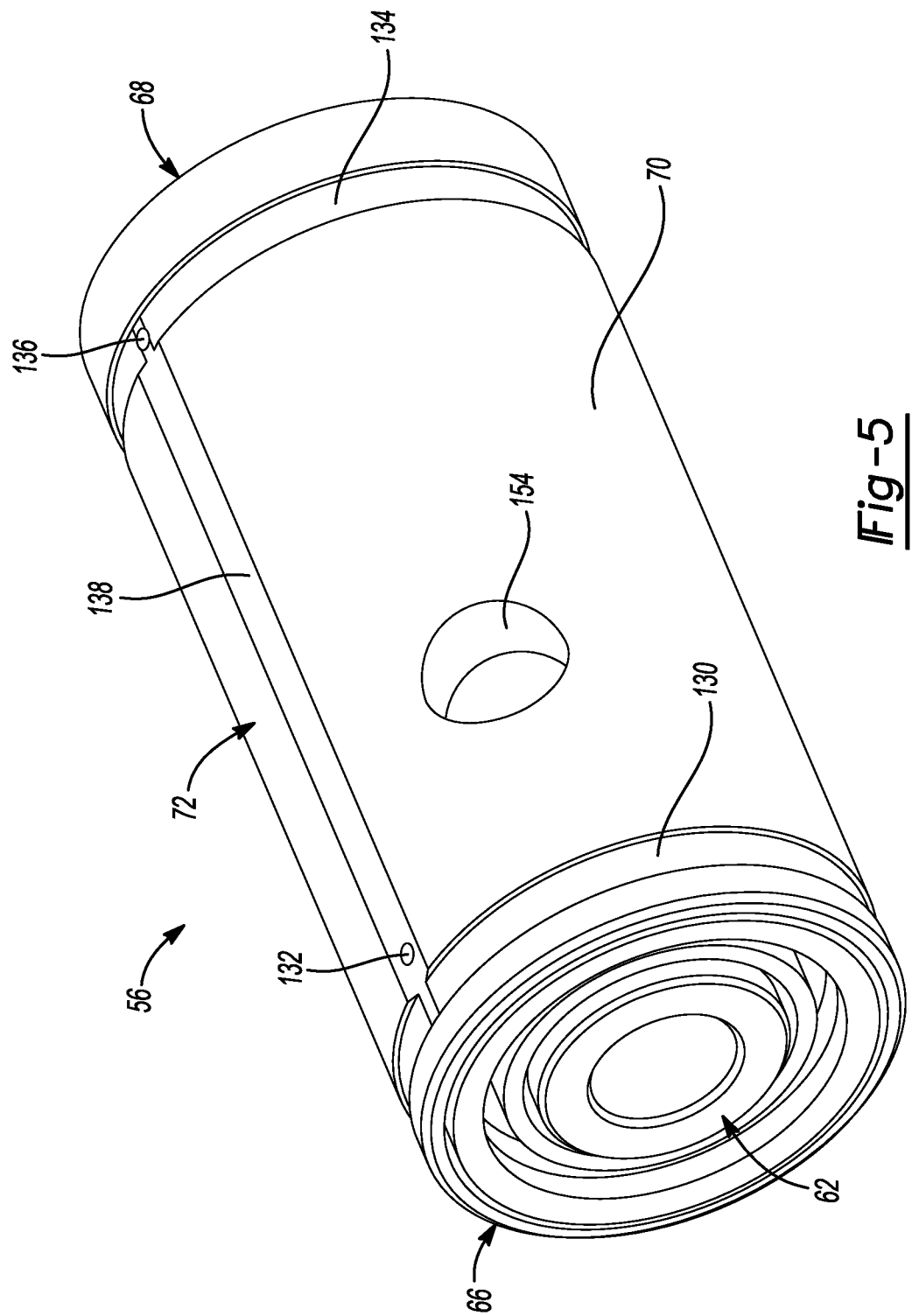
FIG. 5 is a side perspective view of the exemplary bearing cartridge illustrated in FIG. 3.
Figure 6:
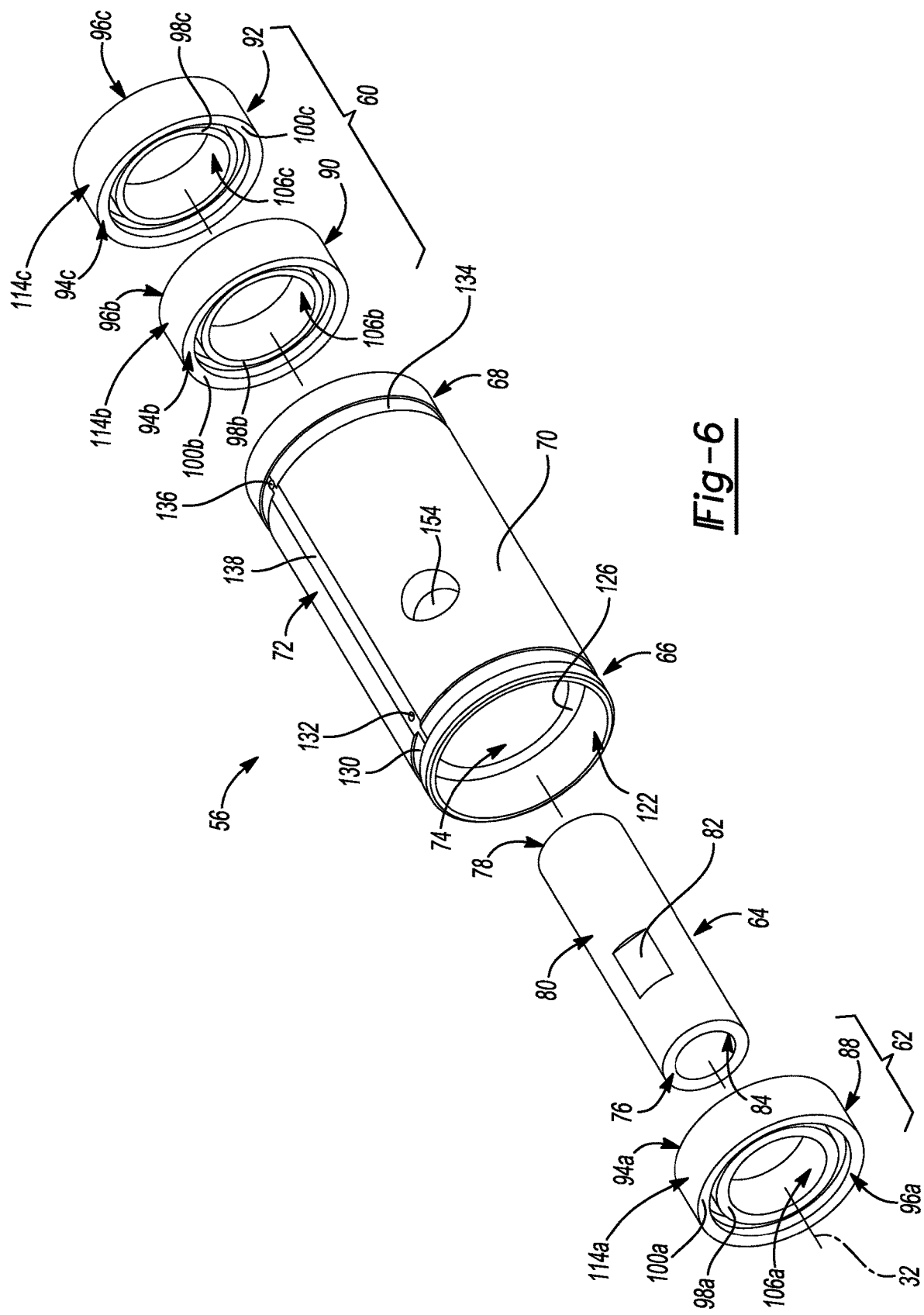
FIG. 6 is an exploded perspective view of the exemplary bearing cartridge illustrated in FIG. 3.

With reference to FIGS. 1 and 2, an exemplary turbocharger assembly 20 is illustrated that generally includes a housing 22, a shaft 24, a turbine wheel 26, and a compressor wheel 28. The shaft 24 has an outer shaft surface 30, is rotatable with respect to the housing 22, and defines a longitudinal axis 32. Both the turbine wheel 26 and the compressor wheel 28 are mounted to the shaft 24. The shaft 24 may be a one-piece shaft 24, or alternatively may be split into multiple segments, such as a turbine segment and a compressor segment. The shaft 24 extends longitudinally between a turbine end 34 that is connected to the turbine wheel 26 and a compressor end 36 that is connected to the compressor wheel 28. The housing 22 includes a turbine section 38, a compressor section 40, and a center section 42 that is positioned longitudinally between the turbine and compressor sections 38, 40 of the housing 22.

The turbine section 38 of the housing 22 includes an exhaust inlet 44 that is radially spaced from the longitudinal axis 32 and an exhaust outlet 46 that is aligned with the longitudinal axis 32. The exhaust inlet 44 and the exhaust outlet 46 are configured to bolt to portions of the exhaust system of the internal combustion engine (not shown). Exhaust gases enter the housing 22 through the exhaust inlet 44 and exit the housing 22 through the exhaust outlet 46. The turbine wheel 26 is disposed in the turbine section 38 of the housing 22 and includes a plurality of turbine blades 48. The flow of exhaust gas pushes against the turbine blades 48, which drives rotation of the turbine wheel 26.

The compressor section 40 of the housing 22 includes an air inlet 50 that is aligned with the longitudinal axis 32 and an air outlet 52 that is radially spaced from the longitudinal axis 32. The air inlet 50 is configured to receive air from the surrounding environment either directly or through an intake system (not shown). The air outlet 52 is configured to be connected to an intake manifold (not shown) of the internal combustion engine via an inlet conduit (not shown), which may optionally include an intercooler (not shown). The compressor wheel 28 is disposed in the compressor section 40 of the housing 22 and includes a plurality of compressor blades 54. Rotation of the turbine wheel 26 drives rotation of the compressor wheel 28 via the shaft 24. The compressor blades 54 pump air through the compressor section 40 of the housing 22 as the compressor wheel 28 rotates and discharge the air through the air outlet 52 at a higher velocity and pressure (i.e., boost) for delivery to the internal combustion engine.

With additional reference to FIGS. 3-7, the turbocharger assembly 20 includes a bearing cartridge 56 that is received within a cartridge receiving bore 58 in the center section 42 of the housing 22 in a slip fit. The bearing cartridge 56 extends co-axially about and supports the shaft 24 at a location positioned longitudinally between the turbine and compressor wheels 26, 28. The bearing cartridge 56 is an assembly that includes a turbine-side ball-bearing assembly 60, a compressor-side ball-bearing assembly 62, and a spacer 64 positioned longitudinally between the turbine-side and compressor-side ball-bearing assemblies 62. The bearing cartridge 56 extends longitudinally between a first bearing cartridge end 66 and a second bearing cartridge end 68. The compressor-side ball-bearing assembly 62 is positioned at the first bearing cartridge end 66 adjacent to the compressor wheel 28 (i.e., is positioned longitudinally between the compressor wheel 28 and the spacer 64) and the turbine-side ball-bearing assembly 60 is positioned at the second bearing cartridge end 68 adjacent to the turbine wheel 26 (i.e., is positioned longitudinally between the turbine wheel 26 and the spacer 64). The bearing cartridge 56 also includes a bearing cartridge wall 70 that has an outer bearing cartridge surface 72 and an inner bearing cartridge surface 74 that are cylindrical in shape. The outer bearing cartridge surface 72 is disposed in contact with the cartridge receiving bore 58 of the center section 42 of the housing 22 in a slip fit.

The spacer 64 is configured to slide over and rotate with the shaft 24. More specifically, the spacer 64 extends co-axially about the shaft 24 and longitudinally between a first spacer end 76 and a second spacer end 78. The spacer 64 is positioned radially between the bearing cartridge wall 70 and the shaft 24 and longitudinally between the compressor-side ball-bearing assembly 62 and the turbine-side ball-bearing assembly 60 such that the first spacer end 76 abuts the compressor-side ball-bearing assembly 62 and the second spacer end 78 abuts the turbine-side ball-bearing assembly 60. Although other configurations are possible, in the illustrated example, the spacer 64 has a cylindrical shape, extends co-axially about the shaft 24, and includes an outer spacer surface 80 with at least one flat 82 (the function of which is explained below) and an inner spacer surface 84 that is arranged in contact with the outer shaft surface 30. The outer spacer surface 80 is spaced radially inward of the inner bearing cartridge surface 74 to define a gap 86 between the bearing cartridge wall 70 and the spacer 64. This gap 86 inside the bearing cartridge 56 extends longitudinally between the compressor-side ball-bearing assembly 62 and the turbine-side ball-bearing assembly 60.

There are two times as many rows of ball-bearings included in the turbine-side ball-bearing assembly 60 compared to the compressor-side ball-bearing assembly 62. More specifically, in the illustrated example, the compressor-side ball-bearing assembly 62 includes a first angular contact ball-bearing 88, while the turbine-side ball-bearing assembly 60 includes a second angular contact ball-bearing 90 and a third angular contact ball-bearing 92. The second and third angular contact ball-bearings 90, 92 of the turbine-side ball-bearing assembly 60 are disposed in end-to-end abutting contact with one another. The turbine-side ball-bearing assembly 60 and the compressor-side ball-bearing assembly 62 are each arranged in a slip fit inside the bearing cartridge wall 70, which makes for easy servicing and the first, second, and third angular contact ball-bearings 88, 90, 92 of the compressor-side and turbine-side ball-bearing assemblies 60 are individually replaceable.

Each of the first, second, and third angular contact ball-bearings 88, 90, 92 has an inboard bearing end 94a, 94b, 94c and an outboard bearing end 96a, 96b, 96c and includes an inner race 98a, 98b, 98c, an outer race 100a, 100b, 100c, and a bearing carrier 102a, 102b, 102c (or cage), which supports one row of balls 104a, 104b, 104c positioned at circumferentially spaced apart locations between the inner and outer races 98a, 98b, 98c, 100a, 100b, 100c. The bearing carrier 102a, 102b, 102c extends annularly about the inner race 98a, 98b, 98c such that the bearing carrier 102a, 102b, 102c is positioned radially between the inner race 98a, 98b, 98c and the outer race 100a, 100b, 100c and includes pockets that hold the balls 104a, 104b, 104c and maintain the circumferential spacing of the balls 104a, 104b, 104c. The inner race 98a, 98b, 98c, outer race 100a, 100b, 100c, and balls 104a, 104b, 104c may be made from a variety of different materials, including without limitation, ceramic materials for improved wear resistance and a reduction in rotating mass and inertia.

The inner race 98a, 98b, 98c extends co-axially about the shaft 24 and longitudinally between the inboard bearing end 94a, 94b, 94c and the outboard bearing end 96a, 96b, 96c. The inner race 98a, 98b, 98c has a first inner race surface 106a, 106b, 106c that is arranged in contact with the outer shaft surface 30 and a second inner race surface 108a, 108b, 108c that is arranged in contact with the balls 104a, 104b, 104c. More specifically, the second inner race surface 108a, 108b, 108c includes a rounded groove 110a, 110b, 110c that supports the balls 104a, 104b, 104c. The outer race 100a, 100b, 100c extends annularly about the bearing carrier 102 and longitudinally between the inboard bearing end 94a, 94b, 94c and the outboard bearing end 96a, 96b, 96c. The outer race 100a, 100b, 100c has a first outer race surface 112a, 112b, 112c that is arranged in contact with the balls 104a, 104b, 104c and a second outer race surface 114a, 114b, 114c that is arranged in contact with the inner bearing cartridge surface 74 of the bearing cartridge wall 70. The first outer race surface 112a, 112b, 112c includes an asymmetrical indentation 116a, 116b, 116c that supports the balls 104a, 104b, 104c and provides a thrust load support angle 118a, 118b, 118c. The first angular contact ball-bearing 88 is arranged such that the thrust load support angle 118a of the first angular contact ball-bearing 88 forms an acute angle with the longitudinal axis 32 that opens/faces towards the compressor wheel 28 and therefore is configured to support a first thrust load 120a (i.e., an axial load) pointing toward the turbine wheel 26. The second and third angular contact ball-bearings 90, 92 are arranged such that the thrust load support angles 118b, 118c of the second and third angular contact ball-bearings 90, 92 form acute angles with the longitudinal axis 32 that open/face towards the turbine wheel 26 and therefore are configured to support a second thrust load 120b (i.e., an axial load) pointing toward the compressor wheel 28.

The bearing cartridge 56 includes a first bearing cartridge opening 122 disposed at the first bearing cartridge end 66 and a second bearing cartridge opening 124 disposed at the second bearing cartridge end 68. The inner bearing cartridge surface 74 of the bearing cartridge wall 70 includes a first shoulder 126 that is positioned inboard of the first bearing cartridge end 66 and a second shoulder 128 that is positioned inboard of the second bearing cartridge end 68. The first angular contact ball-bearing 88 is received within the first bearing cartridge opening 122 in the first bearing cartridge end 66 in a slip fit and is oriented such that the inboard bearing end 94a of the first angular contact ball-bearing 88 abuts the first shoulder 126 of the bearing cartridge wall 70 and the first spacer end 76, while the outboard bearing end 96a of the first angular contact ball-bearing 88 sits flush with the first bearing cartridge end 66. The second angular contact ball-bearing 90 and the third angular contact ball-bearing 92 are both received within the second bearing cartridge opening 124 in the second bearing cartridge end 68 in a slip fit. The second angular contact ball-bearing 90 is oriented such that the inboard bearing end 94b of the second angular contact ball-bearing 90 abuts the second shoulder 128 of the bearing cartridge wall 70 and the second spacer end 78. The third angular contact ball-bearing 92 is oriented such that the inboard bearing end 94c of the third angular contact ball-bearing 92 is arranged in end-to-end abutting contact with the outboard bearing end 96b of the second angular contact ball-bearing 90, while the outboard bearing end 96c of the third angular contact ball-bearing 92 sits flush with the second bearing cartridge end 68.

As explained above, the bearing cartridge 56 is configured such that the turbine-side ball-bearing assembly 60 has two times as many rows of ball-bearings compared to the compressor-side ball-bearing assembly 62. The inventor has found that this particular ratio and bearing arrangement provides optimal durability while reducing drag (i.e., reducing the rotating inertia and rotating resistance) because under this arrangement, the turbine-side ball-bearing assembly 60 provides twice the thrust capacity as the compressor-side ball-bearing assembly 62. As a result of this particular construction, the compressor-side ball-bearing assembly 62 is arranged to counterbalance the thrust capacity of the turbine-side ball-bearing assembly 60 and stabilize the weight of the turbine wheel 26, which is typically much heavier than the compressor wheel 28. For example, the compressor wheel 28 is typically composed of light-weight metals or alloys, such as aluminum. On the other hand, due to its placement in the exhaust flow path, the turbine wheel 26 is typically composed of high temperature (i.e., heat resistant) metals or alloys, such as steel, which are considerably heavier (i.e., more dense). By including two times as many rows of ball-bearings in the turbine-side ball-bearing assembly 60 compared to the compressor-side ball-bearing assembly 62, the bearing cartridge 56 is better able to counterbalance the heavier weight of the turbine wheel 26 as compared to the compressor wheel 28. This particular arrangement also gives the turbine-side ball-bearing assembly 60 added width at the inner and outer races 98b, 98c, 100b, 100c compared to the compressor-side ball-bearing assembly 62 for improved durability. At the same time, the outer diameter of the turbine-side ball-bearing assembly 60 remains small so as not to increase the distance between the longitudinal axis 32 and the balls 104b, 104c/outer race 100b, 100c, which would lead to an unwanted increase in the rotating inertia of the turbine-side ball-bearing assembly 60.

While the bearing cartridge 56 shown in the illustrated example includes three rows of ball-bearings arranged at a 2:1 ratio between the turbine-side ball-bearing assembly 60 and the compressor-side ball-bearing assembly 62, it should be appreciated that the number of rows of ball-bearings may be increased. For example, the compressor-side ball-bearing assembly 62 may further include a fourth angular contact ball-bearing (not shown) such that the compressor-side ball-bearing assembly 62 includes two rows of ball-bearings in total and the turbine-side ball-bearing assembly 60 may further include a fifth angular contact ball-bearing and a sixth angular contact ball-bearing (not shown) arranged in end-to-end contact with one another such that the turbine-side ball-bearing assembly 60 includes four rows of ball-bearings in total.

The ball-bearings in the bearing cartridge 56 are arranged in an open-bath lubrication configuration, where the bearing cartridge wall 70 includes a compressor-side oil inlet channel 130, one or more compressor-side oil inlet holes 132, a turbine-side oil inlet channel 134, one or more turbine-side oil inlet holes 136, and an oil inlet groove 138. The compressor-side oil inlet channel 130 extends circumferentially along the outer bearing cartridge surface 72 near the first bearing cartridge end 66 and the turbine-side oil inlet channel 134 extends circumferentially along the outer bearing cartridge surface 72 near the second bearing cartridge end 68. The oil inlet groove 138 extends longitudinally along the outer bearing cartridge surface 72 (i.e., is parallel to the longitudinal axis 32) between the compressor-side oil inlet channel 130 and the turbine-side oil inlet channel 134 and is therefore arranged in fluid communication with the compressor-side oil inlet channel 130 and the turbine-side oil inlet channel 134.

The compressor-side oil inlet hole(s) 132 extend radially through the bearing cartridge wall 70 and are positioned adjacent to the compressor-side ball-bearing assembly 62 such that the compressor-side ball-bearing assembly 62 is arranged in fluid communication with (and can receive lubricating oil from) the compressor-side oil inlet channel 130 and/or the oil inlet groove 138. The turbine-side oil inlet hole(s) 136 extend radially through the bearing cartridge wall 70 and are positioned adjacent to the turbine-side ball-bearing assembly 60 such that the turbine-side ball-bearing assembly 60 is arranged in fluid communication with (and can receive lubricating oil from) the turbine-side oil inlet channel 134 and/or the oil inlet groove 138. Lubricating oil can flow out of the compressor-side ball-bearing assembly 62 and the turbine-side ball-bearing assembly 60 and into the gap 86 between the spacer 64 and the bearing cartridge wall 70. The bearing cartridge wall 70 further includes an oil outlet hole 140 that extends through the bearing cartridge wall 70 to allow lubricating oil in the gap 86 inside the bearing cartridge 56 to flow out into the cartridge receiving bore 58, where it then collects in the compressor-side oil inlet channel 130, the turbine-side oil inlet channel 134, and the oil inlet groove 138 for recirculation.

Thus, an oil flow path is defined through the bearing cartridge 56 that extends from the compressor-side oil inlet channel 130, the turbine-side oil inlet channel 134, and the oil inlet groove 138, through the compressor-side oil inlet hole(s) 132 and the turbine-side oil inlet hole(s) 136, through the compressor-side and turbine-side ball-bearing assemblies 60, 62, into the gap 86 between the spacer 64 and the bearing cartridge wall 70, and out through the oil outlet hole 140. Gravity may assist the circulation of the lubricating oil along this oil flow path. As such, the oil outlet hole 140 may be positioned below the shaft 24 while the oil inlet groove 138 may be positioned above the shaft 24, such that the oil outlet hole 140 is diametrically opposed from the oil inlet groove 138 relative to the longitudinal axis 32 (i.e., they are oriented 180 degrees apart from one another).

As shown in FIG. 2, the turbocharger assembly 20 also has an optical sensor assembly 142. The optical sensor assembly 142 includes an optical sensor 144 that is housed inside a sensor sleeve 146. The sensor sleeve 146 is generally cylindrical in shape and includes a threaded portion 148 and an unthreaded portion 150. The threaded portion 148 of the sensor sleeve 146 threads into a sensor bore 152 in the center section 42 of the housing 22. The unthreaded portion 150 of the sensor sleeve 146 projects into the cartridge receiving bore 58 of the housing 22 and extends into an optical sensor opening 154 in the bearing cartridge wall 70. The unthread portion of the sensor sleeve 146 terminates at an open end 156 that is longitudinally aligned with the flat(s) 82 on the spacer 64 such that the optical sensor 144 has an unobstructed line of sight to the flat(s) 82 on the outer spacer surface 80. The optical sensor 144 detects a rotational speed of the spacer 64 (and thus the shaft 24) by counting the number of times the flat(s) 82 on the outer spacer surface 80 pass by the optical sensor opening 154 during a pre-determined time interval. The optical sensor 144 is arranged in electronic communication with another electronic device (not shown), such as an electronic control unit (ECU), that processes the signal output of the optical sensor 144 and provides a rotational speed reading for the turbocharger assembly 20. By way of example and without limitation, the rotational speed reading may be expressed in revolutions per minute (rpms) and may be displayed to a vehicle operator/occupant and/or may be utilized as an input to electronic vehicle or engine control systems.

Advantageously, this arrangement where the optical sensor 144 sleeve extends through the housing 22 and the optical sensor opening 154 in the bearing cartridge wall 70 prevents the bearing cartridge 56 from rotating within the housing 22. In addition, as shown in FIG. 7, the optical sensor opening 154 in the bearing cartridge wall 70 and thus the optical sensor assembly 142 is circumferentially spaced from the oil inlet groove 138 by an angle 158 that is less than or equal to 90 degrees. In other words, the optical sensor opening 154 is positioned in an upper half of the bearing cartridge wall 70 and above the longitudinal axis 32. This positioning of the optical sensor assembly 142 minimizes or eliminates the accumulation of lubricating oil in the sensor sleeve 146, which could otherwise obstruct the line of sight of the optical sensor 144.

Many modifications and variations of the turbocharger assembly 20 described herein are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A turbocharger assembly, comprising:
    a housing including a cartridge receiving bore;
    a shaft extending longitudinally between a turbine end and a compressor end along a longitudinal axis;
    a turbine wheel connected to said turbine end of said shaft;
    a compressor wheel connected to said compressor end of said shaft;
    a bearing cartridge disposed within said cartridge receiving bore of said housing that extends co-axially about and supports said shaft at a location positioned longitudinally between said turbine and compressor wheels;
    said bearing cartridge including a bearing cartridge wall that is arranged in contact with said cartridge receiving bore; and
    said bearing cartridge includes a turbine-side ball-bearing assembly adjacent to said turbine wheel and a compressor-side ball-bearing assembly adjacent to said compressor wheel, said compressor-side ball-bearing assembly including a first angular contact ball-bearing and said turbine-side ball-bearing assembly including a second angular contact ball-bearing and a third angular contact ball-bearing that are disposed in end-to-end abutting contact with one another.

2. The turbocharger assembly as set forth in claim 1, further comprising:
    a spacer extending co-axially about said shaft and positioned longitudinally between said turbine-side ball-bearing assembly and said compressor-side ball-bearing assembly.

3. The turbocharger assembly as set forth in claim 2, wherein said spacer includes an outer spacer surface with at least one flat.

4. The turbocharger assembly as set forth in claim 3, further comprising:
    an optical sensor assembly extending through an optical sensor opening in said bearing cartridge wall and said housing to prevent said bearing cartridge from rotating within said housing; and
    said optical sensor assembly positioned to detect a rotational speed of said spacer by counting a number of times said at least one flat on said spacer passes by said optical sensor opening during a pre-determined time interval.

5. The turbocharger assembly as set forth in claim 1, wherein said angular contact ball-bearings each include an inner race, an outer race, a bearing carrier that is positioned radially between said inner race and said outer race, and a plurality of balls rotatably supported by said bearing carrier at circumferentially spaced apart positions.

6. The turbocharger assembly as set forth in claim 5, wherein said outer race of said first angular contact ball-bearing includes an asymmetrical indentation that supports said plurality of balls and provides a first thrust load support angle relative to said longitudinal axis that opens toward said compressor wheel to support a first thrust load pointing toward said turbine wheel and wherein said outer races of said second and third angular contact ball-bearings include asymmetrical indentations that support said plurality of balls and provide a second thrust load support angle relative to said longitudinal axis that opens toward said turbine wheel to support a second thrust load pointing toward said compressor wheel.

7. The turbocharger assembly as set forth in claim 1, further comprising:
    a compressor-side oil inlet channel extending circumferentially along said bearing cartridge wall and positioned adjacent to said compressor-side ball-bearing assembly;
    a compressor-side oil inlet hole extending through said bearing cartridge wall such that said compressor-side ball-bearing assembly is arranged in fluid communication with said cartridge receiving bore via said compressor-side oil inlet hole;
    a turbine-side oil inlet channel extending circumferentially along said bearing cartridge wall and positioned adjacent to said turbine-side ball-bearing assembly; and
    a turbine-side oil inlet hole extending through said bearing cartridge wall such that said turbine-side ball-bearing assembly is arranged in fluid communication with said cartridge receiving bore via said turbine-side oil inlet hole.

8. The turbocharger assembly as set forth in claim 7, further comprising:
    an oil inlet groove in said bearing cartridge wall that extends between and is arranged in fluid communication with said turbine-side oil inlet channel and said compressor-side oil inlet channel; and
    an oil outlet channel extending through said bearing cartridge wall at a location that is diametrically opposed from said oil inlet groove.

9. The turbocharger assembly as set forth in claim 1, wherein said turbine-side ball-bearing assembly and said compressor-side ball-bearing assembly are each arranged in a slip fit inside said bearing cartridge.

10. The turbocharger assembly as set forth in claim 1, wherein there are two times as many rows of ball-bearings included in said turbine-side ball-bearing assembly compared to said compressor-side ball-bearing assembly.

11. The turbocharger assembly as set forth in claim 1, wherein said compressor-side ball-bearing assembly further includes a fourth angular contact ball-bearing such that said compressor-side ball-bearing assembly includes two rows of ball-bearings in total and said turbine-side ball-bearing assembly further includes a fifth angular contact ball-bearing and a sixth angular contact ball-bearing arranged in end-to-end contact with one another such that said turbine-side ball-bearing assembly includes four rows of ball-bearings in total.

12. A turbocharger assembly, comprising:
a housing including a cartridge receiving bore;
a bearing cartridge disposed within said cartridge receiving bore of said housing and including a bearing cartridge wall that is in contact with said cartridge receiving bore;
said bearing cartridge comprising a turbine-side ball-bearing assembly, a compressor-side ball-bearing assembly, and a spacer positioned longitudinally between said turbine-side and compressor-side ball-bearing assemblies;
said spacer includes an outer spacer surface with at least one flat;
an optical sensor opening extending through said bearing cartridge wall; and
an optical sensor extending through said housing and said optical sensor opening in said bearing cartridge wall to prevent said bearing cartridge from rotating within said housing and that is positioned to detect a rotational speed of said spacer by counting a number of times said at least one flat on said spacer passes by said optical sensor opening during a pre-determined time interval.

13. The turbocharger assembly as set forth in claim 12, further comprising:
a shaft extending longitudinally between a turbine end and a compressor end;
a turbine wheel connected to said turbine end of said shaft;
a compressor wheel connected to said compressor end of said shaft;
said spacer being configured to slide over and rotate with said shaft;
said compressor-side ball-bearing assembly positioned adjacent to said compressor wheel and including a first angular contact ball-bearing; and
said turbine-side ball-bearing assembly positioned adjacent to said turbine wheel and including a second angular contact ball-bearing.

14. The turbocharger assembly as set forth in claim 13, wherein said turbine-side ball-bearing assembly further includes a third angular contact ball-bearing such that said second and third angular contact ball-bearings are arranged in end-to-end contact with one another.

15. The turbocharger assembly as set forth in claim 13, wherein there are two times as many rows of ball-bearings included in said turbine-side ball-bearing assembly compared to said compressor-side ball-bearing assembly.

16. The turbocharger assembly as set forth in claim 13, wherein said compressor-side ball-bearing assembly further includes a fourth angular contact ball-bearing such that said compressor-side ball-bearing assembly includes two rows of ball-bearings in total and said turbine-side ball-bearing assembly further includes a fifth angular contact ball-bearing and a sixth angular contact ball-bearing in end-to-end contact such that said turbine-side ball-bearing assembly includes four rows of ball-bearings in total.

17. The turbocharger assembly as set forth in claim 13, wherein said turbine-side ball-bearing assembly and said compressor-side ball-bearing assembly are each arranged in a slip fit inside said bearing cartridge.

18. A turbocharger assembly, comprising:
a housing including a cartridge receiving bore;
a shaft extending longitudinally between a turbine end and a compressor end along a longitudinal axis;
a turbine wheel connected to said turbine end of said shaft;
a compressor wheel connected to said compressor end of said shaft;
a bearing cartridge disposed within said cartridge receiving bore of said housing that extends co-axially about and supports said shaft at a location positioned longitudinally between said turbine and compressor wheels;
said bearing cartridge including a bearing cartridge wall that is arranged in contact with said cartridge receiving bore; and
said bearing cartridge includes a turbine-side ball-bearing assembly adjacent to said turbine wheel and a compressor-side ball-bearing assembly adjacent to said compressor wheel,
wherein there are two times as many rows of ball-bearings included in said turbine-side ball-bearing assembly compared to said compressor-side ball-bearing assembly.

19. The turbocharger assembly as set forth in claim 18, wherein said compressor-side ball-bearing assembly includes a first angular contact ball-bearing such that said compressor-side ball-bearing assembly includes one row of ball-bearings in total and said turbine-side ball-bearing assembly includes a second angular contact ball-bearing and a third angular contact ball-bearing that are disposed in end-to-end abutting contact with one another such that said turbine-side ball-bearing assembly includes two rows of ball-bearings in total.

20. The turbocharger assembly as set forth in claim 18, wherein said compressor-side ball-bearing assembly further includes a fourth angular contact ball-bearing such that said compressor-side ball-bearing assembly includes two rows of ball-bearings in total and said turbine-side ball-bearing assembly further includes a fifth angular contact ball-bearing and a sixth angular contact ball-bearing in end-to-end contact such that said turbine-side ball-bearing assembly includes four rows of ball-bearings in total.

\* \* \* \* \*